United States Patent
Gonzalez et al.

(10) Patent No.: US 8,695,020 B2
(45) Date of Patent: Apr. 8, 2014

(54) TECHNIQUES FOR CUSTOMIZING A TOOLBAR USING WIDGETS

(75) Inventors: Miguel Enrique Cepero Gonzalez, Brossard (CA); Yovel Badash, Brooklyn, NY (US)

(73) Assignee: Visicom Media, LLC, Brossard QC (CA)

( * ) Notice: Subject to any disclaimer, the term of this patent is extended or adjusted under 35 U.S.C. 154(b) by 968 days.

(21) Appl. No.: 12/367,121

(22) Filed: Feb. 6, 2009

(65) Prior Publication Data

US 2010/0205618 A1 Aug. 12, 2010

(51) Int. Cl.
*G06F 9/46* (2006.01)
*G06F 17/30* (2006.01)
*G06F 3/08* (2006.01)

(52) U.S. Cl.
USPC .......................................... 719/328; 715/760

(58) Field of Classification Search
CPC .............................. G06F 17/30126; G06F 9/46
USPC ........... 719/328–329; 709/219, 224; 715/209, 715/733, 234, 760; 705/27, 30, 14; 717/174
See application file for complete search history.

(56) References Cited

U.S. PATENT DOCUMENTS

| | | | |
|---|---|---|---|
| 7,107,548 B2 | 9/2006 | Shafron | |
| 7,185,333 B1 | 2/2007 | Shafron | |
| 7,412,655 B2 | 8/2008 | Wada et al. | |
| 8,196,097 B1 * | 6/2012 | Sampath et al. | 717/110 |
| 2005/0039144 A1 | 2/2005 | Wada et al. | |
| 2007/0101433 A1 * | 5/2007 | Louch et al. | 726/25 |
| 2007/0157118 A1 | 7/2007 | Wuttke | |
| 2008/0104496 A1 * | 5/2008 | Williams et al. | 715/209 |
| 2008/0114739 A1 | 5/2008 | Hayes | |
| 2008/0155425 A1 | 6/2008 | Murthy et al. | |
| 2008/0184138 A1 | 7/2008 | Krzanowski et al. | |
| 2008/0184157 A1 | 7/2008 | Selig | |
| 2008/0195483 A1 * | 8/2008 | Moore | 705/14 |
| 2008/0215997 A1 * | 9/2008 | Wu et al. | 715/760 |
| 2008/0235352 A1 * | 9/2008 | Yolleck et al. | 709/219 |
| 2008/0255962 A1 * | 10/2008 | Chang et al. | 705/27 |
| 2008/0307385 A1 * | 12/2008 | Dreiling et al. | 717/108 |
| 2009/0100329 A1 * | 4/2009 | Espinoza | 715/234 |
| 2009/0172551 A1 * | 7/2009 | Kane et al. | 715/733 |
| 2009/0327483 A1 * | 12/2009 | Thompson et al. | 709/224 |
| 2010/0030752 A1 * | 2/2010 | Goldentouch | 707/3 |
| 2010/0162274 A1 * | 6/2010 | Gangadharappa et al. | 719/328 |

OTHER PUBLICATIONS

Yolleck, Stephen et al. "Active Toolbar Buttons Using a Toolbar Object Model with Automatic Execution of Script" Loaded into the IP.com Prior Art Database on Apr. 19, 2007 UTC; http://priorartdatabase.com/IPCOM/000150866/ Retrieved Feb. 5, 2009.

(Continued)

*Primary Examiner* — Hung T Vy

(74) *Attorney, Agent, or Firm* — Myers Wolin, LLC

(57) ABSTRACT

A method for customizing the functionality of a web-browser extension by installing widgets in the web-browser extension. The method comprises obtaining a manifest file of a new widget from a web server hosting the new widget; extracting an address designating a location in a secured repository of source files of the new widget; retrieving the source files of the new widget; and loading the source files of the new widget to the web-browser extension.

20 Claims, 3 Drawing Sheets

(56) References Cited

OTHER PUBLICATIONS

IBM (disclosed by) "Multi Home-Page For Multi-Tabbed Internet Browsers" Loaded into the IP.com Prior Art Database on May 11, 2005 UTC; http://priorartdatabase.com/IPCOM/000124870/ Retrieved Feb. 5, 2009.

IBM (disclosed by) "Client Side Customization of Widgets and Layout" Loaded into IP.com Prior Art Database on Jul. 21, 2006 UTC; http://priorartdatabase.com/IPCOM/000138499/ Retrieved Feb. 5, 2009.

* cited by examiner

US 8,695,020 B2

TECHNIQUES FOR CUSTOMIZING A TOOLBAR USING WIDGETS

TECHNICAL FIELD

This invention generally relates to browser extensions.

BACKGROUND OF THE INVENTION

Web browsers are software applications that enable the viewing of information accessible on the World Wide Web (or Web). At its most basic, the Web is a collection of documents written using programming languages that web browsers can interpret. Such languages include, for example, a hyper text markup language (HTML), an eXtensible markup language (XML), and the like. Microsoft Internet Explorer®, Mozilla Firefox®, Safari, and Opera are just to name a few examples of web browsers.

Browser extensions are applications such as plug-ins or add-ons that are downloaded and installed on an individual computing device on which a web browser is operating. The browser extensions are compiled separately for each type of web browser. A prime example for a browser extension is a downloadable toolbar. When installed a toolbar allows users to customize their browsing experience.

A typical toolbar includes a search bar where a user can insert her/his search key words which are directly fed into one or more on-line search engines. In addition, a toolbar may include icons serving merely as bookmarks internet resources, such as websites, RSS feeds, email notifications, streamed radio stations, and so on. Thus, the toolbar functionality is limited to provide a shortcut access to such internet resources and/or search engines. In addition, customization of a toolbar is limited to adding a shortcut (a bookmark) icon. In order to add new features generally a new toolbar version is released by the toolbar creator. Then, a user needs to uninstall the previous version and install the new version.

SUMMARY OF THE INVENTION

Certain embodiments of the invention include a method for customizing functionality of a web-browser extension by installing widgets in the web-browser extension. The method comprises obtaining a manifest file of a new widget from a web server hosting the new widget; extracting an address designating a location in a secured repository of source files of the new widget; and retrieving the source files of the new widget; and loading the source files of the new widget to the web-browser extension.

Certain embodiments of the invention also include a computer readable medium having stored thereon computer executable code that when executed causing a processor to perform the process of customizing functionality of a web-browser extension by installing widgets in the web-browser extension. The process comprises obtaining a manifest file of a new widget from a web server hosting the new widget; extracting an address designating a location in a secured repository of source files of the new widget; retrieving the source files of the new widget; and loading the source files of the new widget to the web-browser extension.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
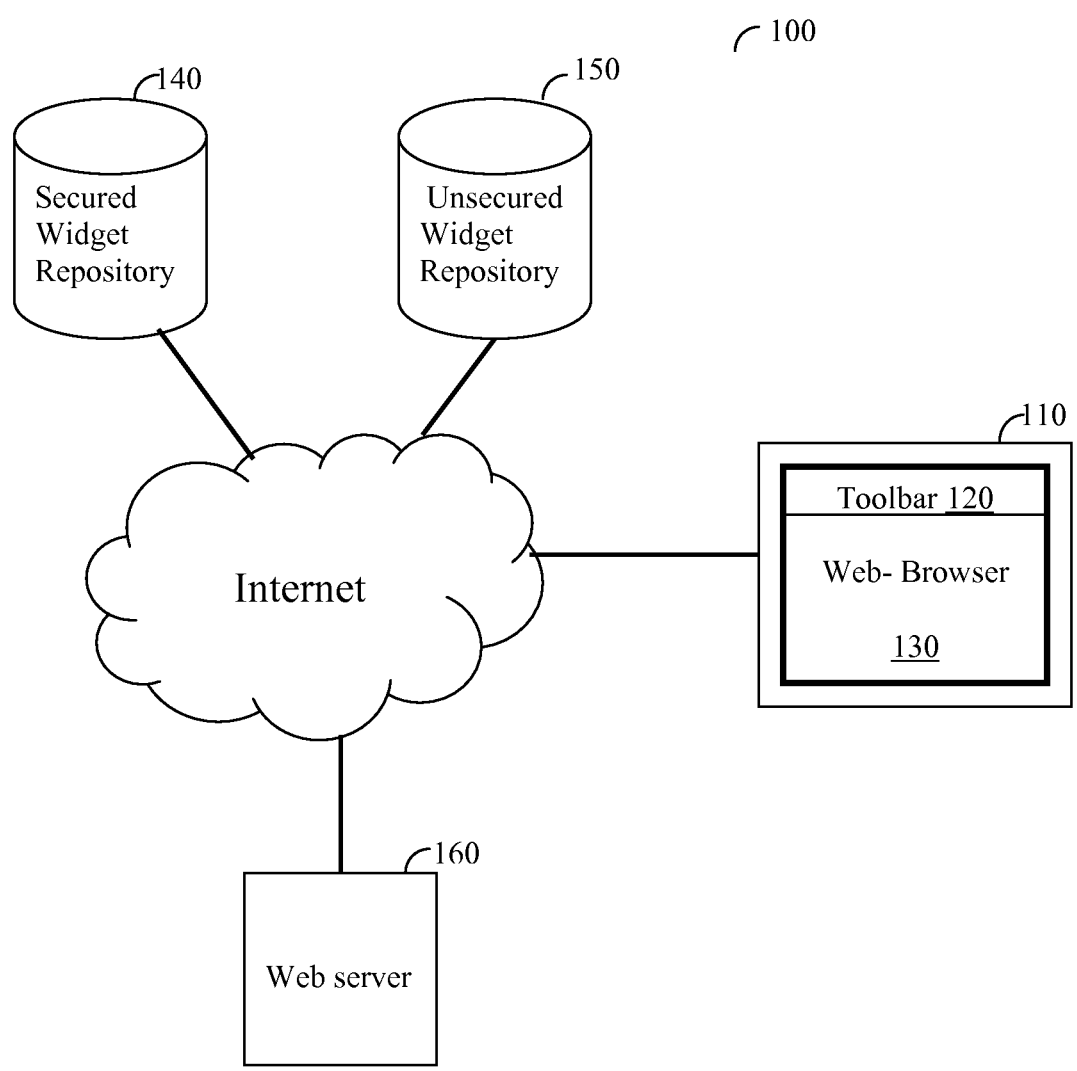
FIG. 1 is a schematic diagram of a system useful in describing the principles of the present invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In one embodiment of the invention a toolbar enabled to host and run a plurality of widgets is disclosed. The widgets may be an application or a control executed from a toolbar. A toolbar can be pre-installed with a list of widgets or such widgets may be added to the toolbar by dragging a widget from a central repository and dropping the widget to the toolbar. Widgets may include, but are not limited to, a media player, an online game, an online interactive program, visual animations, and so on. In addition, widgets may extend the functionality of a toolbar by adding buttons, menus, and so on.

FIG. 1 shows a schematic diagram of a system 100 useful in describing the principles of the present invention. A client 110 runs a widget enabled toolbar 120 on a web browser 130 which may be, for example, Microsoft® Internet Explorer®, Mozilla Firefox®, Opera, Safari, a wireless application protocol (WAP) type browser, and the like. The client 110 may be a computing device, such as a personal computer, a laptop computer, a personal digital assistant (PDA), a mobile phone, a smart phone, and the like.

A storage device 140 is a secured repository that includes a plurality of certified widgets, i.e., widgets that cannot execute harmful code. A storage device 150 is an unsecured repository that includes widgets uploaded by the widget providers. A widget is transferred from the unsecured repository (storage device 150) to the secured repository (storage device 140) once the widget is certified. No access is provided to storage device 140 other than the organizations and/or users who are authorized to certify that the widget's source code does not include harmful instructions.

A widget contributor may be any user or a business entity that develops a widget and desires to share the widget with other users, i.e., to allow users to install the widget on their web-browser. The widget contributor can charge users for installing and using its widgets or offer the widget for free. In accordance with an embodiment of the invention a monetary method for trading widgets is provided and will be described in detail below.

The widget-enabled toolbar 120 is constructed to enable the execution of widgets as well as to add and remove widgets from the toolbar. The toolbar 120 is further described in U.S. patent application Ser. No. 12/270,421, now pending, assigned to the common assignee and it is hereby incorporated by reference for all that it contains. As mentioned above the toolbar 120 may be pre-installed with a set of widgets. In order to add a new widget the user has to access a web server 160 which hosts available widgets for installation, once the desired widget is selected the user merely needs to drag the widget (typically represented by an icon) to the toolbar 120. Thereafter, the selected widget is automatically installed on the toolbar 120. It should be noted that many web sites may publish available widgets, but all the widgets must be stored in a secured and trusted repository and order to be installed in the toolbar 120.

Figure 2:
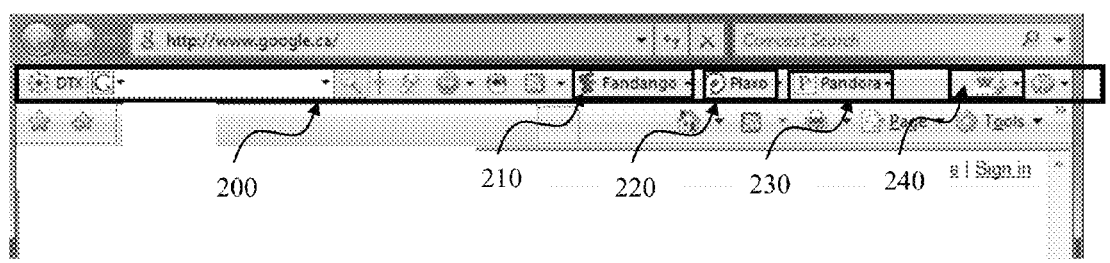
FIG. 2 is an exemplary screenshot of a widget enabled toolbar.

An exemplary screenshot of a widget-enabled toolbar 200 constructed in accordance with the principles of the invention is shown in FIG. 2. The toolbar 200 hosts the following widgets Fandango® 210, Plaxo 220 which both provide links to their respective websites, and Pandora® 230 which connects to a Pandora service to retrieve a list of favorite radio stations of a user. A button 240 allows a user to add widgets by connecting the client 110 to one or more web servers that host widgets that can be downloaded by the users.

Figure 3:
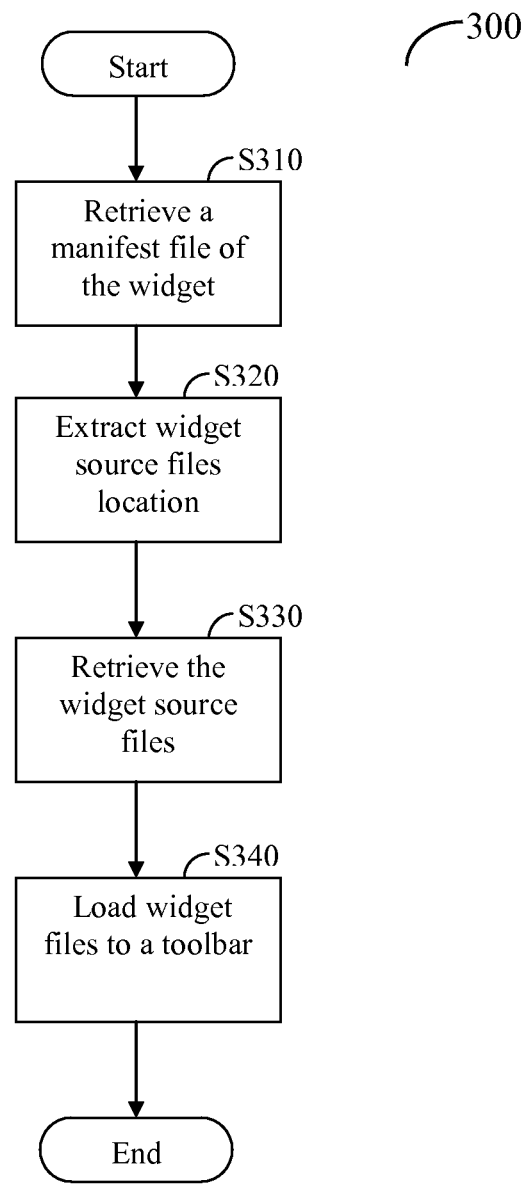
FIG. 3 is a process for customizing a toolbar as implemented in accordance with an embodiment of the invention.

FIG. 3 shows a non-limiting and exemplary flowchart 300 describing the process for customizing a widget-enabled toolbar as implemented in accordance with an embodiment of the invention. The toolbar is an enabled widget toolbar constructed, for example, using the teachings disclosed in the Ser. No. 12/270,421 application referenced-above. The user may add and/or remove widgets from the toolbar. A user needs to select a widget that he/she wants to add to the toolbar. The selection maybe from one or more web-sites that host the widgets. Once a widget is selected the user has to drag an icon of the widget to the toolbar. The user can access these web-sites through a shortcut button on his toolbar. Upon dragging a selected widget's icon to the toolbar the process to install the widget starts at S310, where a manifest file associated with the widget is retrieved from a web server that hosts the selected widget. The manifest file includes at least an address to a secure repository that maintains the widget's source files. The manifest file may also include a widget's attributes, such as widget provider, date of creation, type of usage (e.g., free, license fee based, usage-based, transaction-based, etc.), price per type of usage, and so on. Techniques for generating monetary information based on the different usage types are disclosed below.

At S320 the address of the widget's source files is extracted from the manifest file, and thereafter, at S330, the widget's files retrieved from the secured repository. The widget's files typically include script and binary files that form executable code of the widget. At S340 the widget's files are loaded to the toolbar's execution engine, causing the toolbar to display the widget icon and to execute any functionality of the widget. Specifically, one of the widget files includes a Widget Constructor. The code of the Widget Constructor when loaded into the toolbar's execution engine causing the memory instance of the Widget to be created. The memory instance is active in the runtime environment of the web browser. It should be noted that if the user wishes to uninstall the widget, then all the widget's files are deleted from the local computer executing the toolbar.

It should be appreciated that the process described herein allows users to easily customize their toolbars by adding or removing widgets. As the widgets are not limited only to website shortcuts (or bookmarks), but rather provides additional features the user experience is greatly improved.

In accordance with a preferred embodiment of the invention techniques for generating monetary information based on usage information are provided. These techniques would allow widget providers to be compensated on widgets that they developed and contributed. Accordingly, a widget owner uploads a widget and manifests the widget's usage type. For example, the usage type may be based on a one-time license fee, a renewal based license fee, usage-based, transaction-based, and so on.

When a license fee usage type is applied, before installation of the widget in the toolbar or when a renewal is due, the user is prompted to pay the license fee. For usage-based widgets the toolbar monitors and registers the number of times that a user activates the widgets. This parameter is used to compute the compensation that the widget owner and/or any other party are entitled for. When a transaction-based compensation is applied, monetary transactions accomplished through the widget are monitored and registered and can be later used for calculating the compensation that the widget provider and/or any other party are entitled for. For example, if a widget enables the ordering of movie tickets online, then for every transaction (i.e., a ticket order) the widget provider is entitled for a certain percentage of the ticket price.

The principles of the invention may be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What we claim is:

1. A method for customizing functionality of a web-browser extension by installing widgets in the web-browser extension of a web-browser in a client device, comprising:

obtaining a manifest file of a new widget from a web server hosting the new widget, wherein the manifest file is an object recognizable by the web-browser extension and includes at least an address to a secured repository;

extracting from the manifest file the address designating the location in a secured repository of source files of the new widget;
initiating an installation process of the new widget in the web-browser extension, upon identification of the address in the manifest file, wherein the installation process includes:
retrieving the source files of the new widget; and
loading the source files of the new widget to the web-browser extension, wherein the web-browser extension comprises at least a toolbar executed on a web browser.

2. The method of claim 1, wherein the installation of the new widget is triggered by dragging an icon associated with the new widget from the web server into the web-browser extension.

3. The method of claim 1, further comprising:
uploading the source files of a widget to an unsecured repository;
certifying the source files; and
uploading certified source files to the secured repository.

4. The method of claim 3, wherein certified source files do not include any harmful executable code.

5. The method of claim 1, wherein the manifest file further designates a usage type of the new widget and a monetary compensation method.

6. The method of claim 5, wherein the usage type is selected from a group consisting of: free usage, license fee based, usage-based, and transaction-based.

7. The method of claim 5, further comprising:
monitoring the usage of the new widget; and
generating monetary information based on usage information, the usage type of the new widget and the compensation method.

8. The method of claim 1, wherein further comprising uninstalling a widget by deleting source files of the widget from the web-browser extension.

9. The method of claim 1, wherein the widget comprises at least one of: an application executed from the toolbar and a control executed from the toolbar.

10. The non-transitory computer readable medium of claim 1, further comprising:
uploading the source files of a widget to an unsecured repository;
certifying the source files; and
uploading certified source files to the secured repository.

11. The non-transitory computer readable medium of claim 10, wherein certified source files do not include any harmful executable code.

12. The method of claim 1, wherein the widget source files include script and binary files that form executable code of the widget, wherein one of the widget source files includes a widget constructor, the widget constructor when loaded into the web-browser execution causing a memory instance of the widget to be created, wherein the memory instance is active in the runtime environment of the web browser.

13. A non-transitory computer readable medium having stored thereon computer executable code when executed causing a processor of a client device to perform the process of customizing functionality of a web-browser extension of a web browser by installing widgets in the web-browser extension, comprising:
obtaining a manifest file of a new widget from a web server hosting the new widget, wherein the manifest file is an object recognizable by the web-browser extension and includes at least an address to a secured repository;
extracting from the manifest file the address designating the location in a secured repository of source files of the new widget;
initiating an installation process of the new widget in the web-browser extension, upon identification of the address in the manifest file, wherein the installation process includes:
retrieving the source files of the new widget; and
loading the source files of the new widget to the web-browser extension, wherein the web-browser extension comprises at least a toolbar executed on a web browser.

14. The non-transitory computer readable medium of claim 13, wherein the installation of the new widget is triggered by dragging an icon associated with the new widget from the web server into the web-browser extension.

15. The non-transitory computer readable medium of claim 13, wherein the manifest file further designates a usage type of the new widget and a monetary compensation method.

16. The non-transitory computer readable medium of claim 15, wherein the usage type is selected from a group consisting of: free usage, license fee based, usage-based, and transaction-based.

17. The non-transitory computer readable medium of claim 15, further comprising:
monitoring the usage of the new widget; and
generating monetary information based on usage information, the usage type of the new widget and the compensation method.

18. The non-transitory computer readable medium of claim 13, wherein further comprising uninstalling a widget by deleting source files of the widget from the web-browser extension.

19. The non-transitory computer readable medium of claim 13, wherein the widget comprises at least one of: an application executed from the toolbar and a control executed from the toolbar.

20. The non-transitory computer readable medium of claim 13, wherein the widget source files include script and binary files that form executable code of the widget, wherein one of the widget source files includes a widget constructor, the widget constructor when loaded into the web-browser execution causing a memory instance of the Widget to be created, wherein the memory instance is active in the runtime environment of the web browser.

* * * * *